US012434059B2

(12) United States Patent
Dieken et al.

(10) Patent No.: US 12,434,059 B2
(45) Date of Patent: Oct. 7, 2025

(54) OUTPUT SIGNAL DRIVERS

(71) Applicant: INSPIRE MEDICAL SYSTEMS, INC., Golden Valley, MN (US)

(72) Inventors: David Dieken, Minneapolis, MN (US); John Rondoni, Plymouth, MN (US); Tim Piessens, Bornem (BE); Wim Gewillig, Heverlee (BE)

(73) Assignee: Inspire Medical Systems, Inc., Golden Valley, MN (US)

( * ) Notice: Subject to any disclaimer, the term of this patent is extended or adjusted under 35 U.S.C. 154(b) by 408 days.

(21) Appl. No.: 18/008,222

(22) PCT Filed: Jun. 10, 2021

(86) PCT No.: PCT/US2021/036772
§ 371 (c)(1),
(2) Date: Dec. 5, 2022

(87) PCT Pub. No.: WO2021/252737
PCT Pub. Date: Dec. 16, 2021

(65) Prior Publication Data
US 2023/0201593 A1    Jun. 29, 2023

Related U.S. Application Data

(60) Provisional application No. 63/064,128, filed on Aug. 11, 2020, provisional application No. 63/037,095, filed on Jun. 10, 2020.

(51) Int. Cl.
*A61N 1/36* (2006.01)
*A61N 1/05* (2006.01)
*A61N 1/378* (2006.01)

(52) U.S. Cl.
CPC ....... *A61N 1/36125* (2013.01); *A61N 1/3787* (2013.01); *A61N 1/0551* (2013.01)

(58) Field of Classification Search
CPC ............. A61N 1/36125; A61N 1/3787; A61N 1/0551; A61N 1/025; A61N 1/08; A61N 1/3603; A61N 1/36; H03K 3/53
See application file for complete search history.

(56) References Cited

U.S. PATENT DOCUMENTS

2008/0061630 A1   3/2008   Andreu et al.
2012/0290046 A1   11/2012  Ker et al.
(Continued)

FOREIGN PATENT DOCUMENTS

CN        105031813 A     11/2015
WO        2021252737 A1   12/2021

OTHER PUBLICATIONS

Li et al., "16-Channel biphasic current-mode programmable charge balanced neural stimulation", BioMed Eng Online, vol. 16, Issue 104, Aug. 14, 2017, (14 pages).

*Primary Examiner* — Paula J Stice
(74) *Attorney, Agent, or Firm* — Dicke, Billig & Czaja, PLLC

(57) ABSTRACT

An output signal driver includes a positive output node, a negative output node, a power supply input node, a power supply common node, a charging capacitor, a discharging capacitor, a current source, a current sink, a first switch, a second switch, and a controller. The charging capacitor is coupled to the power supply input node. The discharging capacitor is coupled to the negative output node. The current source is coupled between the power supply input node and the positive output node. The current sink is coupled between the positive output node and the power supply common node. The first switch is coupled in parallel with the current source. The second switch is coupled in parallel with the current sink. The controller is coupled to the current source, the current sink, the first switch, and the second (Continued)

switch to apply either complementary constant current pulses or complementary constant voltage pulses to the positive output node.

22 Claims, 10 Drawing Sheets

(56) References Cited

U.S. PATENT DOCUMENTS

| | | | |
|---|---|---|---|
| 2015/0051670 A1* | 2/2015 | Hocken | A61N 1/36125 607/62 |
| 2019/0111249 A1 | 4/2019 | Butz et al. | |
| 2020/0155841 A1 | 5/2020 | Bhagat et al. | |

* cited by examiner

OUTPUT SIGNAL DRIVERS

CROSS REFERENCE TO RELATED APPLICATIONS

This Utility Patent Application claims priority under 35 U.S.C. § 371 to International Application No. PCT/US2021/036772, filed Jun. 10, 2021, which claims the benefit of U.S. Provisional Patent Application No. 63/064,128, filed Aug. 11, 2020, and U.S. Provisional Patent Application No. 63/037,095, filed Jun. 10, 2020, all of which are incorporated herein by reference.

BACKGROUND

Medical devices, such as implantable medical devices, may include a stimulation engine to provide therapeutic electrical pulses to tissue within a patient.

DETAILED DESCRIPTION

Figure 1A:
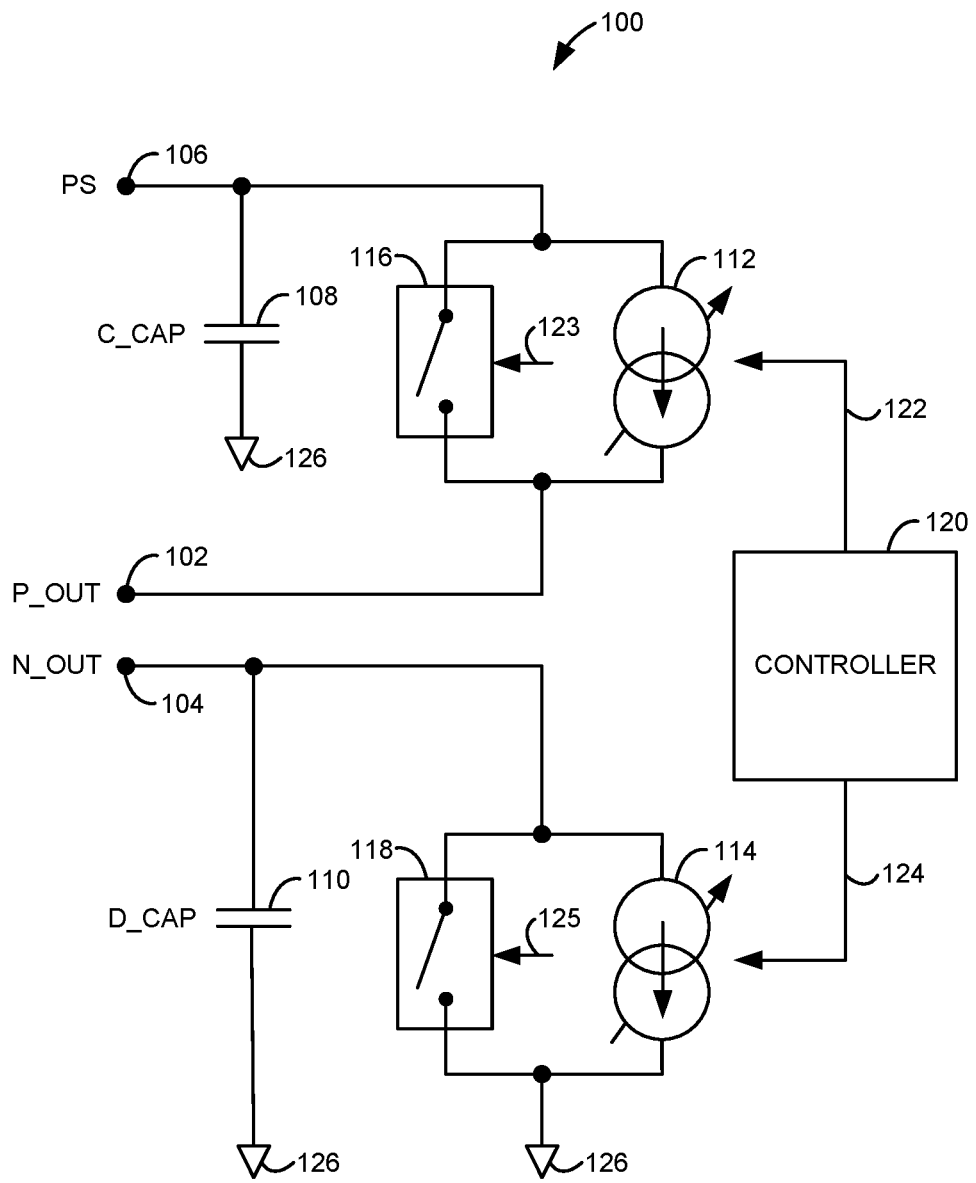
FIGS. 1A and 1B are schematic diagrams illustrating examples of an output signal driver.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to stimulation circuitry for providing stimulation therapies. In some examples, the stimulation therapy may be adapted to provide peripheral nerve stimulation, which in some examples may comprise treatment of sleep disordered breathing (SDB). The sleep disordered breathing may comprise obstructive sleep apnea, central sleep apnea, and/or multiple-type sleep apnea. In doing so, the stimulation may be directed to tissue(s) which at least partially control upper airway patency, such as those nerves innervating at least the muscles of the tongue, the palate, and/or related upper airway musculature. Such nerves include, but are not limited to, the hypoglossal nerve. In some such examples, the stimulation therapy may be adapted to be applied directly to musculature related to controlling upper airway patency. In some examples, the stimulation therapy may be directed to stimulation of the phrenic nerve and/or diaphragm to treat central sleep apnea and/or treat multiple-type apnea.

In some examples, the peripheral nerve stimulation may be implemented to treat incontinence, including one or both of urinary incontinence and fecal incontinence of a patient, or other pelvic disorders. At least some such examples comprise implanting an electrode to deliver a nerve stimulation signal to one or more nerves or nerve branches to activate a corresponding external sphincter, such as a branch of the pudendal nerve that activates the external urethral sphincter and/or the external anal sphincter. In some examples, such stimulation therapies also may be adapted to directly stimulate related muscles.

In some examples, a stimulation therapy may be implemented as cardiac therapy, i.e. therapies to treat various cardiac tissues and may involve stimulation of nerve targets and/or related muscle targets.

In some examples, a stimulation therapy may be implemented as treatment of the disorders and dysfunctions of the central nervous system (CNS).

In providing any of the above-described example therapies, an example stimulation circuitry may form part of a medical device (e.g., an implantable medical device), which may comprise an implantable pulse generator. At least some various example implementations are further described below.

At least some of the above-described examples of stimulation of physiological targets may be implemented according to a stimulation circuitry, such as the output signal driver as further described and illustrated below in association with at least FIGS. 1-7. However, it will be understood that the various examples described in association with FIGS. 1-7 may also be applicable to stimulation therapies other than, or in addition to, the above-described examples.

Among other attributes, at least some example stimulation circuitry of the present disclosure may provide a more compact stimulation package while enabling multiple stimulation modes, such as a voltage stimulation mode or a current stimulation mode, while utilizing fewer components. Providing more compact and efficient arrangements may enable faster and/or simpler implantation of a device in which such stimulation circuitry is incorporated, and/or may enable greater battery longevity for an implantable medical device.

While the output signal driver described below is disclosed as being part of a medical device, such as an implantable medical device, the output signal driver is also applicable to non-implantable medical devices (e.g., trial stimulator, temporary stimulator, TENS, etc.) and non-medical devices, such as motion control (e.g., motors, solenoids, etc.), measurement instrumentation, line drivers (e.g., for a CAN bus), or any application where efficient delivery of a pulsed waveform to a load is required.

FIG. 1A is a schematic diagram illustrating one example of an output signal driver 100. Output signal driver 100 may be part of a medical device, such as an implantable medical device to treat sleep disordered breathing (e.g., sleep apnea) and/or to provide other medical stimulation therapies. Output signal driver 100 includes a positive output node (P_OUT) 102, a negative output node (N_OUT) 104, a power supply input node (PS) 106, a first capacitor (e.g., a charging capacitor (C_CAP)) 108, a second capacitor (e.g., a discharging capacitor (D_CAP)) 110, a first current source 112, a second current source (e.g., a current sink) 114, a first switch 116, a second switch 118, and a controller 120. The charging capacitor 108 is electrically coupled between the power supply input node 106 and a power supply common node (e.g., ground) 126. The discharging capacitor 110 is electrically coupled between the negative output node 104 and the power supply common node 126.

The current source 112 is electrically coupled between the power supply input node 106 and the positive output node 102. The current sink 114 is electrically coupled between the negative output node 104 and the power supply common node 126. The first switch 116 is electrically coupled between the power supply input node 106 and the positive output node 102 in parallel with the current source 112. The second switch 118 is electrically coupled between the negative output node 104 and the power supply common node 126 in parallel with the current sink 114. The controller 120 is electrically coupled to a control input of the current source 112 through a signal path 122, a control input of the current sink 114 through a signal path 124, a control input of the first switch 116 through a signal path 123, and a control input of the second switch 118 through a signal path 125.

Positive output node 102 is configured to be electrically coupled to a first electrode (not shown), and negative output node 104 is configured to be electrically coupled to a second electrode (not shown). The first electrode and the second electrode may be positioned within a patient. The first electrode and the second electrode may be used to deliver a therapy to the patient via output signal driver 100. Controller 120 may control the functions of output signal driver 100 to apply either complementary constant current pulses or complementary constant voltage pulses between the positive output node 102 and the negative output node 104.

Power supply input node 106 is configured to be electrically coupled to a power supply used to power output signal driver 100. In one example, the power supply is a DC power supply and may include a battery. Charging capacitor 108 may be charged by a voltage on power supply input node 106. Discharging capacitor 110 may be charged by a voltage applied to positive output node 102 and passed through tissue of a patient coupled between the positive output node 102 and the negative output node 104. Discharging capacitor 110 may be discharged through the tissue of the patient when the voltage applied to positive output node 102 is removed.

First switch 116 is controlled based on a control signal on signal path 123 from controller 120. In response to a first state of the control signal on signal path 123, first switch 116 is closed to connect the power supply input node 106 to the positive output node 102. In response to a second state of the control signal on signal path 123, first switch 116 is opened to disconnect the power supply input node 106 from the positive output node 102.

In one example, current source 112 is a variable current source. Current source 112 is controlled by a control signal on signal path 122 from controller 120. In response to the control signal on signal path 122, current source 112 may be enabled or disabled and the current applied to positive output node 102 from current source 112 may be adjusted. In one example, current source 112 receives a digital signal (e.g., a 12 bit digital signal) and generates a current on positive output node 102 corresponding to the digital signal.

Second switch 118 is controlled based on a control signal on signal path 125 from controller 120. In response to a first state of the control signal on signal path 125, second switch 118 is closed to connect the negative output node 104 to the power supply common node 126. In response to a second state of the control signal on signal path 125, second switch 118 is opened to disconnect the negative output node 104 from the power supply common node 126.

In one example, current sink 114 is a variable current source. Current sink 114 is controlled by a control signal on signal path 124 from controller 120. In response to the control signal on signal path 124, current sink 114 may be enabled or disabled and the current sunk from negative output node 104 through current sink 114 may be adjusted. In one example, current sink 114 receives a digital signal (e.g., a 12 bit digital signal) and generates a current on negative output node 104 corresponding to the digital signal. The current generated on positive output node 102 by current source 112 may be equal and opposite to the current generated on negative output node 104 by current sink 114.

Controller 120 may include a central processing unit (CPU), microprocessor, microcontroller, application-specific integrated circuit (ASIC), and/or other suitable logic circuitry for controlling the operation of output signal driver 100. Controller 120 may include a memory storing machine-readable instructions (e.g., firmware) executed by the controller for controlling the operation of output signal driver 100. Controller 120 may operate output signal driver 100 in a voltage stimulation mode or a current stimulation mode. In the voltage stimulation mode, controller 120 disables current source 112 and current sink 114 and controls first switch 116 and second switch 118 to apply complementary constant voltage pulses between the positive output node 102 and the negative output node 104. In the current stimulation mode, controller 120 opens first switch 116 and second switch 118 and controls current source 112 and current sink 114 to apply complementary constant current pulses between the positive output node 102 and the negative output node 104. The voltage stimulation mode will be described in more detail below with reference to FIGS. 2A-2C, and the current stimulation mode will be described in more detail below with reference to FIGS. 3A-3E.

Figure 1B:
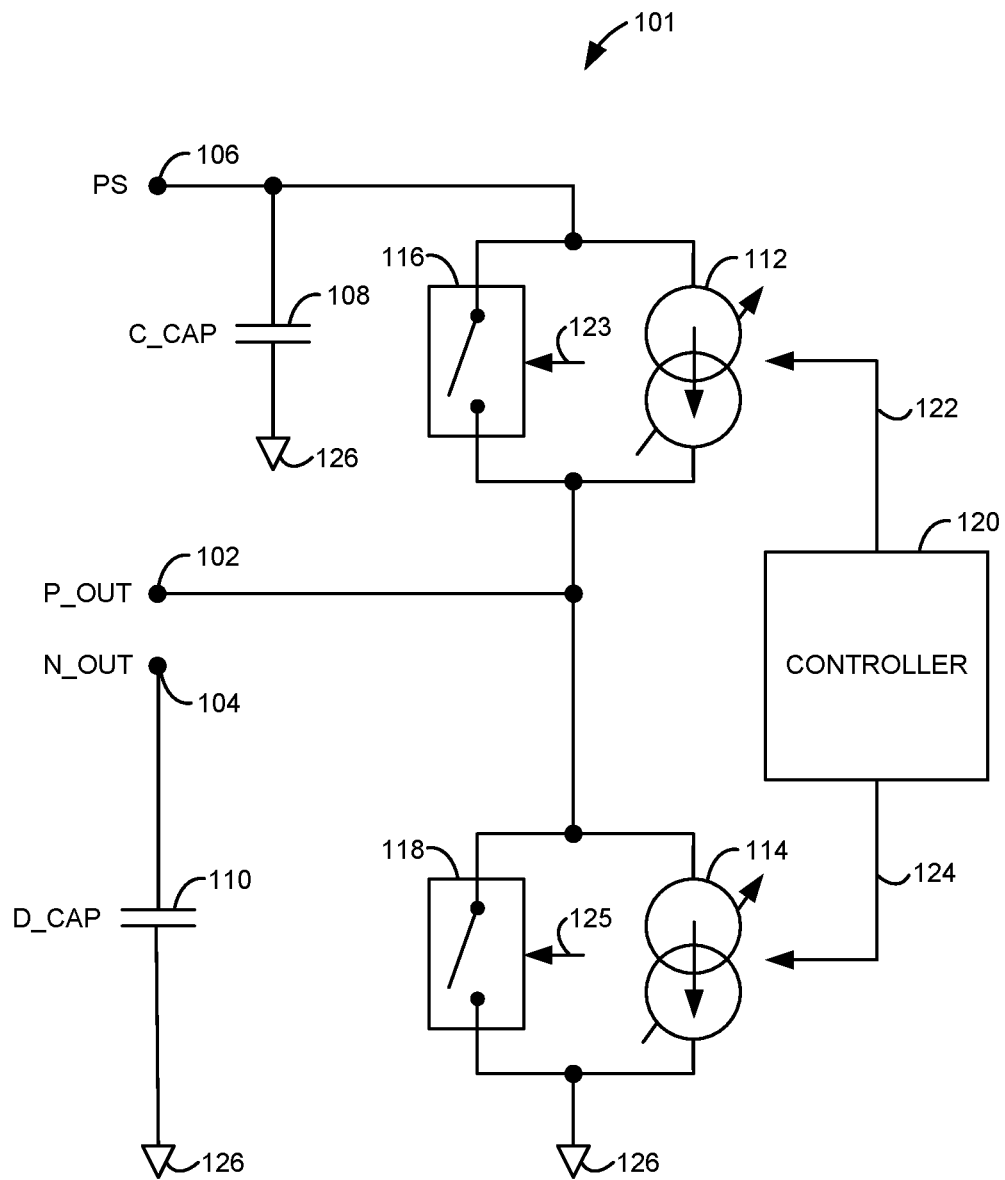

FIG. 1B is a schematic diagram illustrating another example of an output signal driver 101. Output signal driver 101 may be part of a medical device, such as an implantable medical device to treat sleep disordered breathing (e.g., sleep apnea) and/or to provide other medical stimulation therapies. Output signal driver 101 includes a positive output node (P_OUT) 102, a negative output node (N_OUT) 104, a power supply input node (PS) 106, a first capacitor (e.g., a charging capacitor (C_CAP)) 108, a second capacitor (e.g., a discharging capacitor (D_CAP)) 110, a first current source 112, a second current source (e.g., a current sink) 114, a first switch 116, a second switch 118, and a controller 120. The charging capacitor 108 is electrically coupled between the power supply input node 106 and a power supply common node (e.g., ground) 126. The discharging capacitor 110 is electrically coupled between the negative output node 104 and the power supply common node 126.

The current source 112 is electrically coupled between the power supply input node 106 and the positive output node 102. The current sink 114 is electrically coupled between the positive output node 102 and the power supply common node 126. The first switch 116 is electrically coupled between the power supply input node 106 and the positive output node 102 in parallel with the current source 112. The second switch 118 is electrically coupled between the positive output node 102 and the power supply common node 126 in parallel with the current sink 114. The controller 120 is electrically coupled to a control input of the current source 112 through a signal path 122, a control input of the current sink 114 through a signal path 124, a control input of the first switch 116 through a signal path 123, and a control input of the second switch 118 through a signal path 125.

Positive output node 102 is configured to be electrically coupled to a first electrode (not shown), and negative output node 104 is configured to be electrically coupled to a second electrode (not shown). The first electrode and the second electrode may be positioned within a patient. The first electrode and the second electrode may be used to deliver a therapy to the patient via output signal driver 101. Controller 120 may control the functions of output signal driver 101 to apply either complementary constant current pulses or complementary constant voltage pulses between the positive output node 102 and the negative output node 104.

Power supply input node 106 is configured to be electrically coupled to a power supply used to power output signal driver 101. In one example, the power supply is a DC power supply and may include a battery. Charging capacitor 108 may be charged by a voltage on power supply input node 106. Discharging capacitor 110 may be charged by a voltage applied to positive output node 102 and passed through tissue of a patient coupled between the positive output node 102 and the negative output node 104. Discharging capacitor 110 may be discharged through the tissue of the patient when the voltage applied to positive output node 102 is removed.

First switch 116 is controlled based on a control signal on signal path 123 from controller 120. In response to a first state of the control signal on signal path 123, first switch 116 is closed to connect the power supply input node 106 to the positive output node 102. In response to a second state of the control signal on signal path 123, first switch 116 is opened to disconnect the power supply input node 106 from the positive output node 102.

In one example, current source 112 is a variable current source. Current source 112 is controlled by a control signal on signal path 122 from controller 120. In response to the control signal on signal path 122, current source 112 may be enabled or disabled and the current applied to positive output node 102 from current source 112 may be adjusted. In one example, current source 112 receives a digital signal (e.g., a 12 bit digital signal) and generates a current on positive output node 102 corresponding to the digital signal.

Second switch 118 is controlled based on a control signal on signal path 125 from controller 120. In response to a first state of the control signal on signal path 125, second switch 118 is closed to connect the positive output node 102 to the power supply common node 126. In response to a second state of the control signal on signal path 125, second switch 118 is opened to disconnect the positive output node 102 from the power supply common node 126.

In one example, current sink 114 is a variable current source. Current sink 114 is controlled by a control signal on signal path 124 from controller 120. In response to the control signal on signal path 124, current sink 114 may be enabled or disabled and the current sunk from positive output node 102 through current sink 114 may be adjusted. In one example, current sink 114 receives a digital signal (e.g., a 12 bit digital signal) and generates a current on positive output node 102 corresponding to the digital signal. The current generated on positive output node 102 by current source 112 may be equal and opposite to the current generated on positive output node 102 by current sink 114.

Controller 120 may include a central processing unit (CPU), microprocessor, microcontroller, application-specific integrated circuit (ASIC), and/or other suitable logic circuitry for controlling the operation of output signal driver 101. Controller 120 may include a memory storing machine-readable instructions (e.g., firmware) executed by the controller for controlling the operation of output signal driver 101. Controller 120 may operate output signal driver 101 in a voltage stimulation mode or a current stimulation mode. In the voltage stimulation mode, controller 120 disables current source 112 and current sink 114 and controls first switch 116 and second switch 118 to apply complementary constant voltage pulses to the positive output node 102. In the current stimulation mode, controller 120 opens first switch 116 and second switch 118 and controls current source 112 and current sink 114 to apply complementary constant current pulses to the positive output node 102. The voltage stimulation mode will be described in more detail below with reference to FIGS. 2A-2C, and the current stimulation mode will be described in more detail below with reference to FIGS. 3A-3E.

Figure 2A:
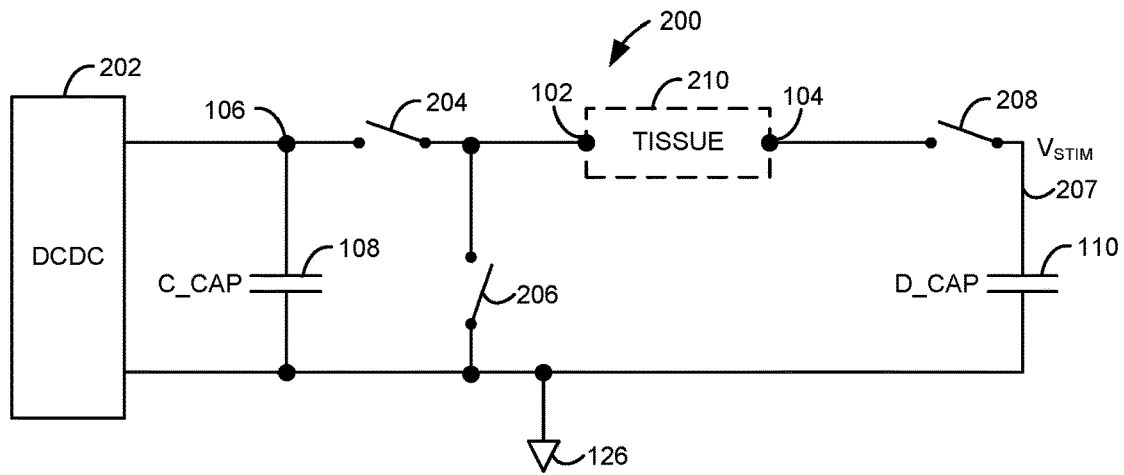
FIGS. 2A-2C are simplified schematic diagrams illustrating examples of an output signal driver configured for voltage stimulation mode in various states.

FIG. 2A is a simplified schematic diagram illustrating one example of an output signal driver 200 configured in a voltage stimulation mode. Output signal driver 200 includes positive output node 102, negative output node 104, power supply input node 106, charging capacitor 108, discharging capacitor 110, and power supply common node 126 as previously described and illustrated with reference to FIG. 1B. In addition, output signal driver 200 includes a DC to DC converter 202 and switches 204, 206, and 208.

DC to DC converter 202 is electrically coupled between the power supply input node 106 and the power supply common node 126. DC to DC convertor 202 may apply a selected supply voltage to power supply input node 106. In one example, DC to DC convertor 202 may convert a DC voltage from a battery (not shown) to the selected supply voltage applied to power supply input node 106. In one example, DC to DC convertor 202 applies a voltage within a range between 0V and 10V to power supply input node 106.

Charging capacitor 108 (e.g., a 47 µF capacitor) is electrically coupled between the power supply input node 106 and the power supply common node 126. Switch 204 is electrically coupled between the power supply input node 106 and the positive output node 102. Switch 206 is electrically coupled between the positive output node 102 and the power supply common node 126. One side of switch 208 is electrically coupled to the negative output node 104. The other side of switch 208 is electrically coupled to one side of discharging capacitor 110 (e.g., a 10 µF capacitor) a through a signal path 207. The other side of discharging capacitor 110 is electrically coupled to power supply common node 126.

Tissue 210 of a patient may be between a first electrode coupled to positive output node 102 and a second electrode coupled to negative output node 104. In one example, tissue 210 may be represented by an electrode-electrolyte model simplified to one equivalent capacitor $C_{eq}$ equal to 0.87 µF.

Switches 204, 206, and 208 may be controlled by a controller, such as controller 120 previously described and illustrated with reference to FIG. 1B. In FIG. 2A, output signal driver 200 is illustrated as disabled. In the disabled state, switches 204, 206, and 208 are open. Output signal driver 200 may operate in two phases including a stimulation phase illustrated in FIG. 2B to and a recharge phase illustrated in FIG. 2C. In the disabled state illustrated in FIG. 2A, neither a stimulation pulse nor a recharge pulse is being applied between the positive output node 102 and the negative output node 104.

Figure 2B:
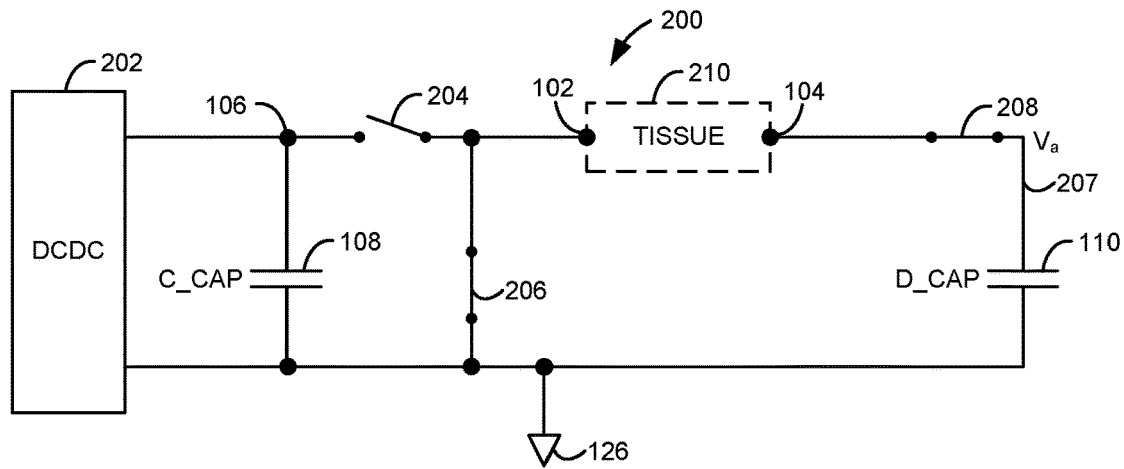

FIG. 2B is a simplified schematic diagram illustrating one example of the output signal driver 200 configured for a stimulation phase in the voltage stimulation mode. In other examples, the phase illustrated by FIG. 2B may be termed a complementary phase. Prior to the stimulation phase, discharging capacitor 110 is charged to a voltage $V_{STIM}$ as illustrated on signal path 207 in FIG. 2A. In the stimulation phase, switch 204 is opened and switches 206 and 208 are closed. Thus, the voltage on discharging capacitor 110 is discharged through tissue 210. One side of the $C_{eq}$ of tissue 210 is pulled towards power supply common node 126 through switch 206, while the other side of $C_{eq}$ of tissue 210 is connected to the discharging capacitor 110 through switch 208. As a result, the initial voltage $V_{STIM}$ on the discharging capacitor 110 is reduced towards a new settled voltage $V_a$.

Figure 2C:
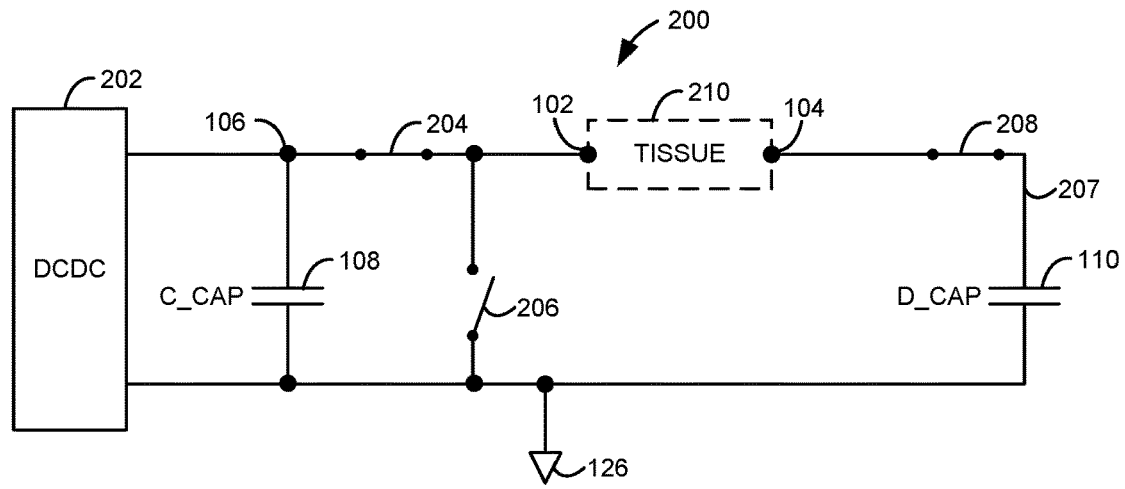

FIG. 2C is a simplified schematic diagram illustrating one example of the output signal driver 200 configured for the complementary phase in the voltage stimulation mode. In one example, where the phase illustrated by FIG. 2B is termed the complementary phase, the phase illustrated in FIG. 2C may be termed the stimulation phase and may occur before the complementary phase of FIG. 2B. In the complementary phase, switches 204 and 208 are closed and switch 206 is opened. Thus, the discharging capacitor 110 is recharged by DC to DC converter 202 through switches 204 and 208 and tissue 210. Since one side of $C_{eq}$ of tissue 210 was previously connected to power supply common node 126 through switch 206 during the stimulation phase (FIG. 2B) and now is connected to the DC to DC converter 202, the total amount of charge ($\delta Q_{RCHG}$) that will flow though the tissue 210 during the complementary phase may be calculated. The total amount of charge that will flow through the tissue 210 during the complementary phase is equal to the voltage ($V_{DCDC}$) of the DC to DC converter 202 times the equivalent capacitance of discharge capacitor 110 in series with $C_{eq}$ of tissue 210.

Figure 3A:
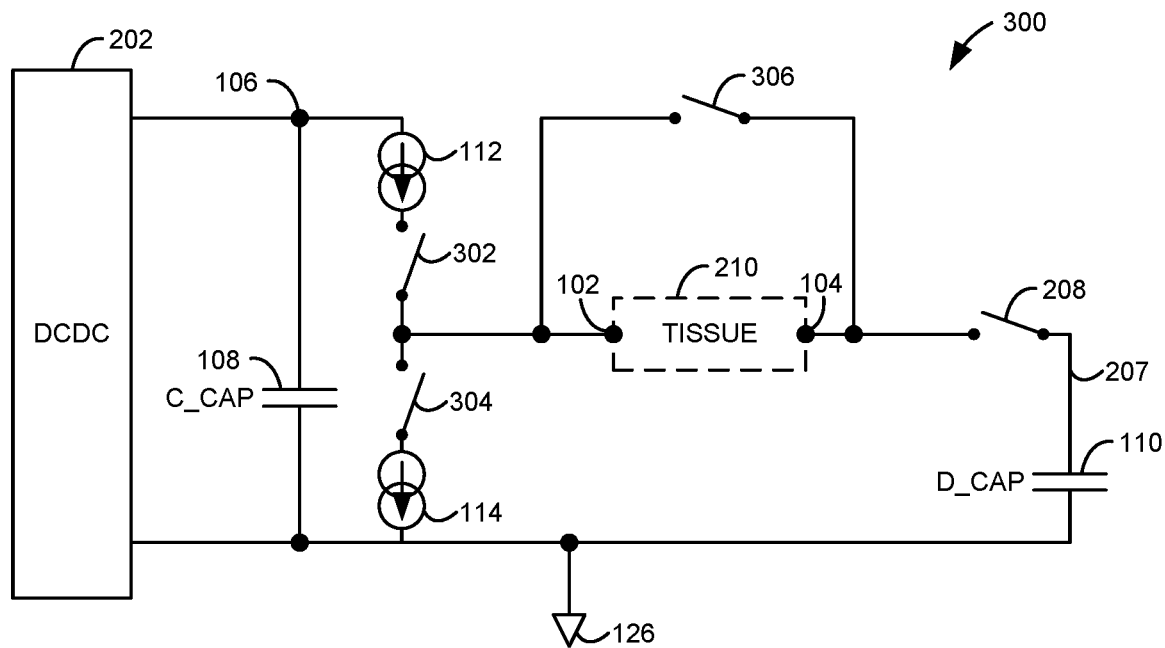
FIGS. 3A-3E are simplified schematic diagrams illustrating examples of an output signal driver configured for current stimulation mode in various states.

FIG. 3A is a simplified schematic diagram illustrating one example of an output signal driver 300 configured in a current stimulation mode. Output signal driver 300 includes positive output node 102, negative output node 104, power supply input node 106, charging capacitor 108, discharging capacitor 110, current source 112, current sink 114, and power supply common node 126 as previously described and illustrated with reference to FIG. 1B. Output signal driver 300 also includes DC to DC converter 202 and switch 208 as previously described and illustrated with reference to FIG. 2A. In addition, output signal driver 300 includes switches 302, 304, and 306.

DC to DC converter 202 is electrically coupled between the power supply input node 106 and the power supply common node 126. Charging capacitor 108 is electrically coupled between the power supply input node 106 and the power supply common node 126. One side of current source 112 is electrically coupled to power supply input node 106, and the other side of current source 112 is electrically coupled to one side of switch 302. The other side of switch 302 is electrically coupled to positive output node 102. One side of switch 304 is electrically coupled to positive output node 102, and the other side of switch 304 is electrically coupled to one side of current sink 114. The other side of current sink 114 is electrically coupled to power supply common node 126. Switch 306 is electrically coupled between the positive output node 102 and the negative output node 104. One side of switch 208 is electrically coupled to the negative output node 104. The other side of switch 208 is electrically coupled to one side of discharging capacitor 110 through the signal path 207. The other side of discharging capacitor 110 is electrically coupled to power supply common node 126. Tissue 210 of a patient may be between a first electrode coupled to positive output node 102 and a second electrode coupled to negative output node 104.

Switches 208, 302, 304, and 306 may be controlled by a controller, such as controller 120 previously described and illustrated with reference to FIG. 1B. In FIG. 3A, output signal driver 300 is illustrated as disabled. In the disabled state, switches 208, 302, 304, and 306 are open. Output signal driver 300 may operate in three phases including a passive phase illustrated in FIG. 3B, an active charge (i.e., stimulation) phase illustrated in FIG. 3C, and an active complementary phase illustrated in FIG. 3D. In the disabled state illustrated in FIG. 3A, neither a stimulation pulse nor a complementary pulse is being applied between the positive output node 102 and the negative output node 104.

Figure 3B:
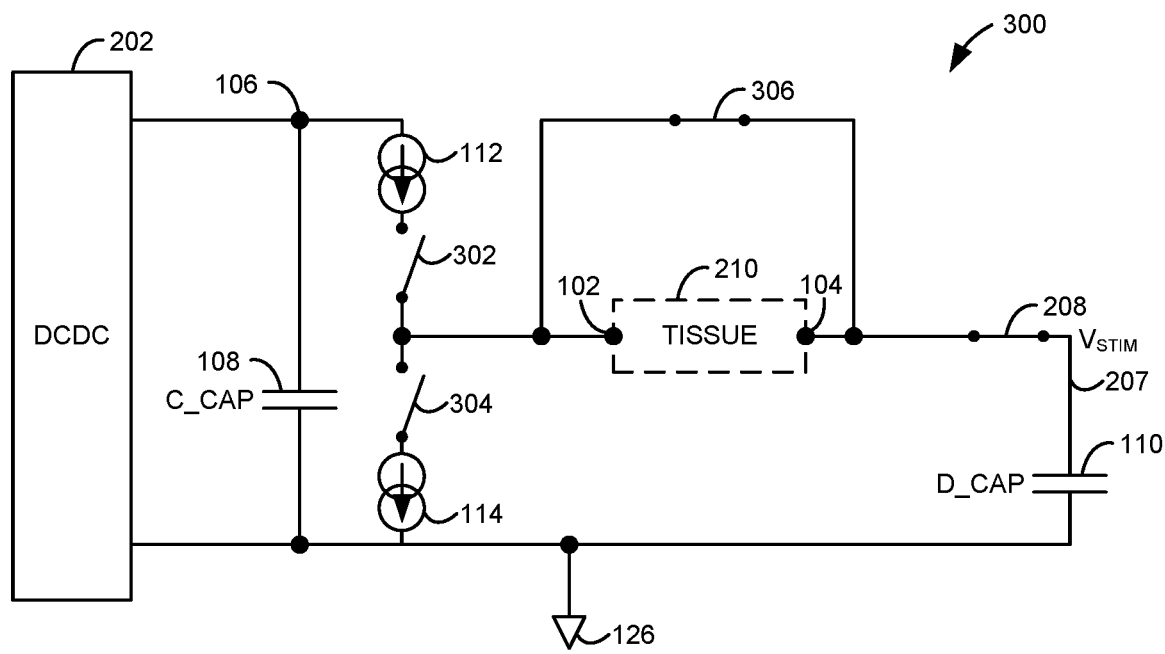

FIG. 3B is a simplified schematic diagram illustrating one example of the output signal driver 300 configured for a passive phase in the current stimulation mode. In the passive phase, switches 302 and 304 are opened and switches 208 and 306 are closed. Thus, an initial voltage $V_{STIM}$ is stored on the discharging capacitor 110 during a startup phase of the DC to DC converter 202 due to charge build up on the electrodes (connected to the positive output node 102 and the negative output node 104) during a previous active charge phase. During the passive phase, both the positive output node 102 and the negative output node 104 are equalized towards $V_{STIM}$.

Figure 3C:
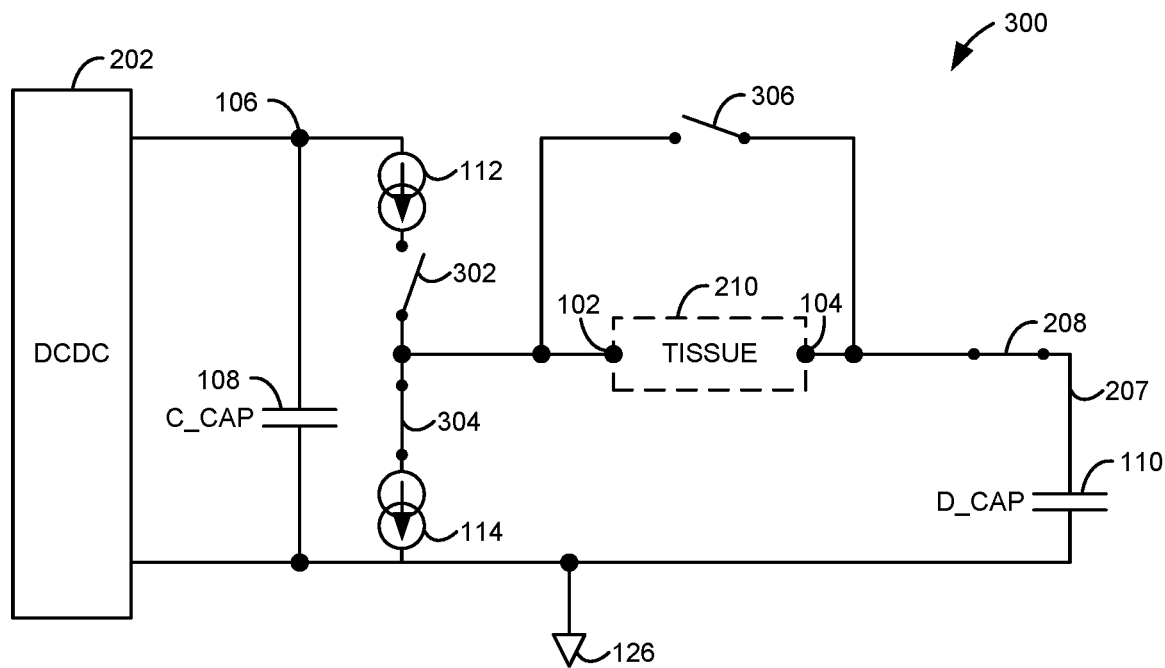

FIG. 3C is a simplified schematic diagram illustrating one example of the output signal driver 300 configured for an active charge phase in the current stimulation mode. In the active charge phase, switches 302 and 306 are opened and switches 208 and 304 are closed. Thus, the discharging capacitor 110 and $C_{eq}$ of tissue 210 are discharged through the tissue 210 and switch 304 by activating the current sink 114.

Figure 3D:
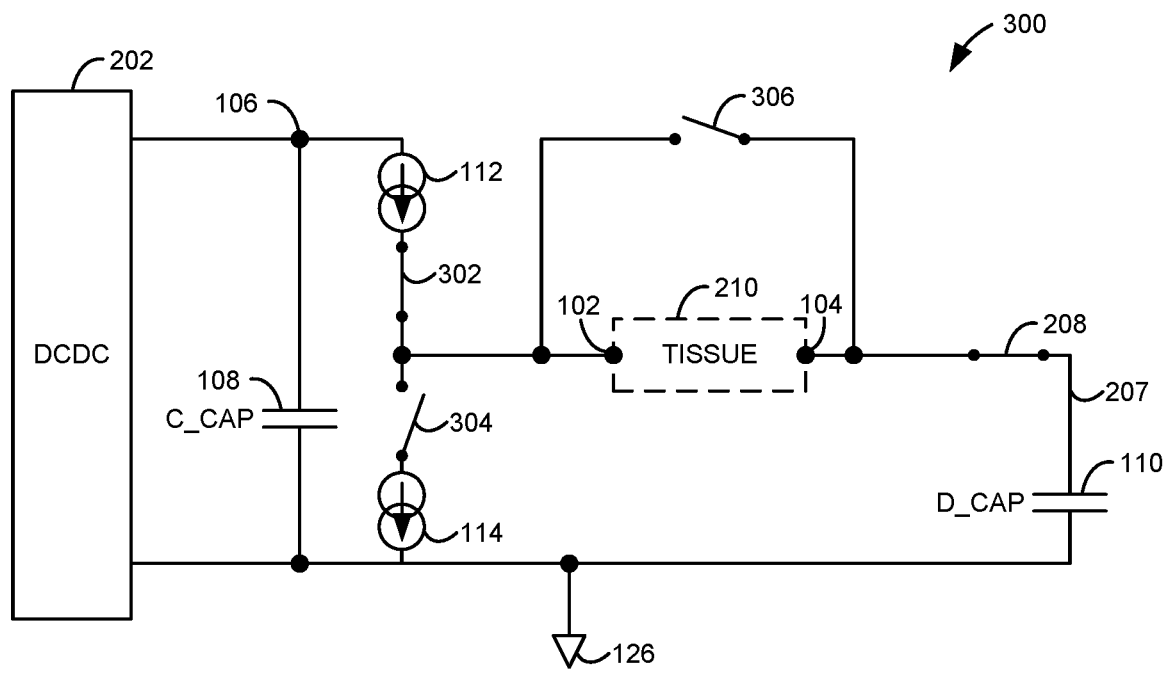

FIG. 3D is a simplified schematic diagram illustrating one example of the output signal driver 300 configured for an active complementary phase in the current stimulation mode. In the active complementary phase, switches 304 and 306 are opened and switches 208 and 302 are closed. Thus, current source 112 is activated to flow current through switch 302, tissue 210, and switch 208 to recharge discharging capacitor 110. Complementary signals are created by matching the current source 112 and the current sink 114. Additional balance may be provided by the passive phase.

Figure 3E:
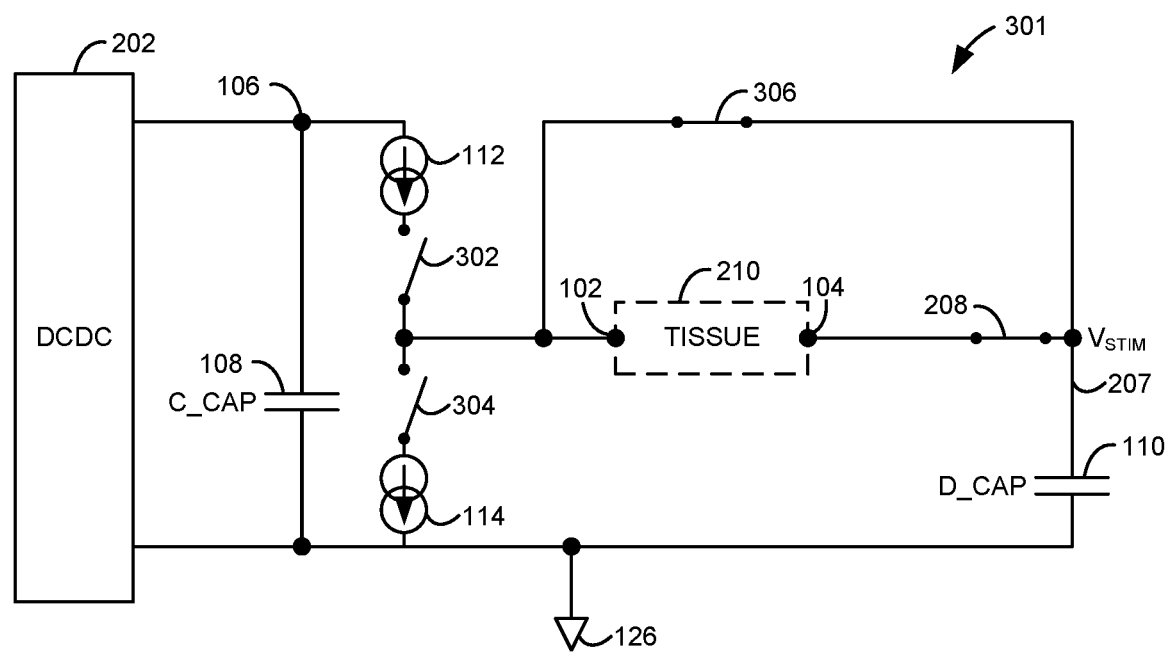

FIG. 3E is a simplified schematic diagram illustrating another example of an output signal driver 301 configured for a passive phase in the current stimulation mode. Output signal driver 301 is similar to output signal driver 300 previously described, except that in output signal driver 301 switch 306 is electrically coupled between the positive output node 102 and the discharging capacitor 110. In the passive phase, switches 302 and 304 are opened and switches 208 and 306 are closed. Thus, an initial voltage $V_{STIM}$ is stored on the discharging capacitor 110 during a startup phase of the DC to DC converter 202 due to charge build up on the electrodes (connected to the positive output node 102 and the negative output node 104) during a previous active charge phase. During the passive phase, both the positive output node 102 and the negative output node 104 are equalized towards $V_{STIM}$. In the disabled state, active charge phase, and active complementary phase, switch 306 of output signal driver 301 may be opened.

Figure 4:
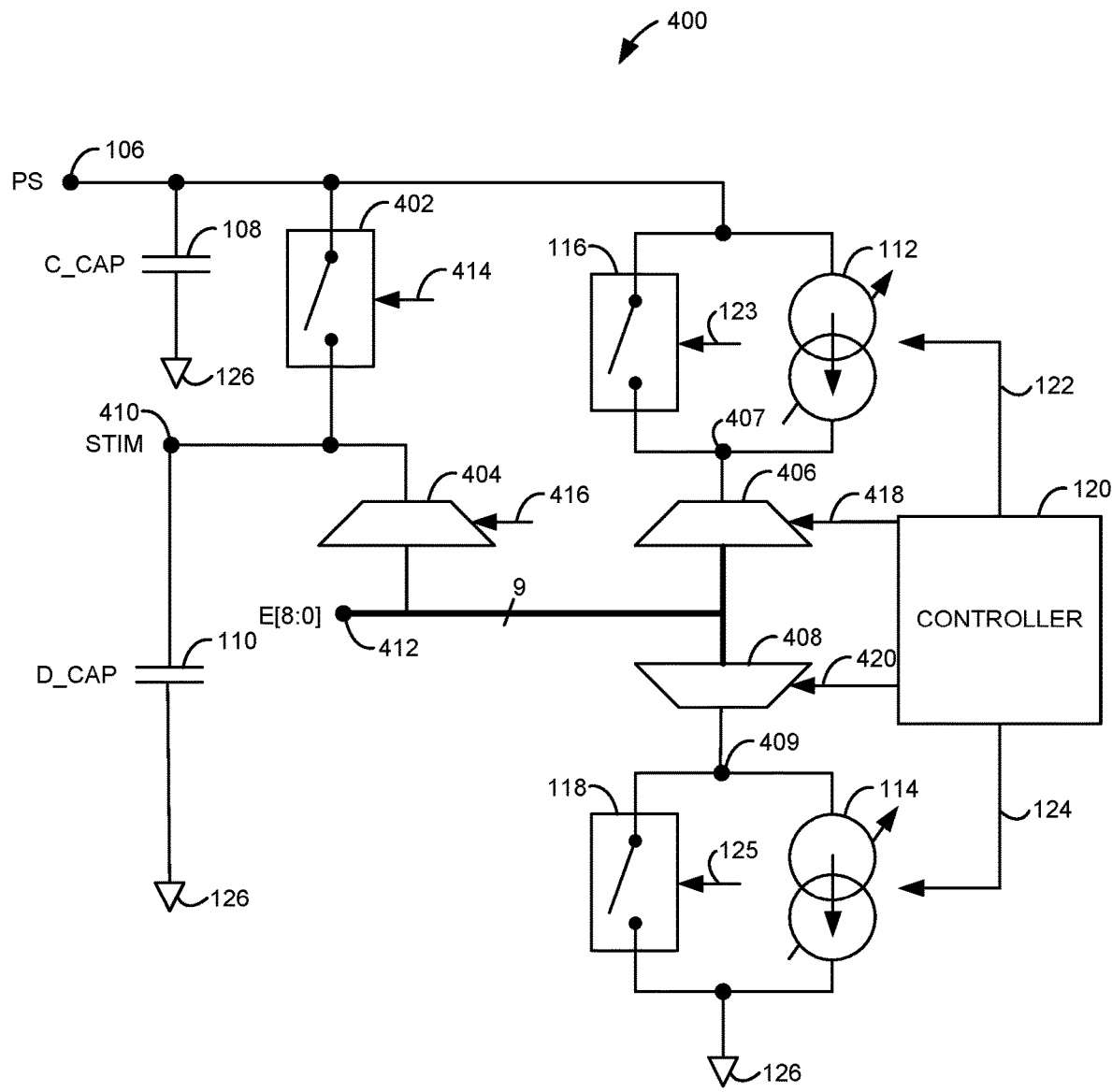
FIG. 4 is a schematic diagram illustrating another example of an output signal driver.

FIG. 4 is a schematic diagram illustrating another example of an output signal driver 400. Output signal driver 400 may be part of an implantable medical device, such as an implantable medical device to treat sleep disordered breathing (e.g., sleep apnea). Output signal driver 400 may be operated in a voltage stimulation mode as previously described and illustrated with reference to FIGS. 2A-2C or in a current stimulation mode as previously described and illustrated with reference to FIGS. 3A-3E.

Output signal driver 400 includes a power supply input node 106, a power supply common node (e.g., ground) 126, a stimulation node (STIM) 410, a first capacitor (C_CAP) 108, a second capacitor (D_CAP) 110, a first current source 112, a second current source (e.g., a current sink) 114, a first switch 116, a second switch 118, at least one output node 412, and a controller 120. Output signal driver 400 may also include a third switch 402, a plurality of output nodes 412 including the at least one output node, a fourth switch (e.g., a single-pole switch or a multiplexer) 404, a fifth switch (e.g., a single-pole switch or a multiplexer) 406, and a sixth switch (e.g., a single-pole switch or a multiplexer) 408.

The first current source 112 is electrically coupled to the power supply input node 106. The first switch 116 is electrically coupled in parallel with the first current source 112. The second current source 114 is electrically coupled to the power supply common node 126. The second switch 118 is electrically coupled in parallel with the second current source 114. The third switch 402 is electrically coupled between the power supply input node 106 and the stimulation node 410. The fourth switch 404 is electrically coupled between the stimulation node 410 and the plurality of output nodes 412. The fifth switch 406 is electrically coupled between the first switch 116 and the first current source 112 (through a node 407) and the plurality of output nodes 412. The sixth switch 408 is electrically coupled between the second switch 118 and the second current source 114 (through a node 409) and the plurality of output nodes 412. The first capacitor 108 is electrically coupled between the power supply input node 106 and the power supply common node 126. The second capacitor 110 is electrically coupled between the stimulation node 410 and the power supply common node 126. Output signal driver 400 may also include a DC to DC converter coupled to the power supply input node 106, such as DC to DC converter 202 previously described and illustrated with reference to FIG. 2A.

Output signal driver 400 may also include a plurality (e.g., 9) of electrodes (E[8:0]), where each electrode is electrically coupled to a corresponding output node of the plurality of output nodes 412. The electrodes E[8:0] may be positioned within a patient. The electrodes E[8:0] may be used to deliver a therapy to the patient via output signal driver 400.

As previously described with reference to FIG. 1B, the controller 120 is electrically coupled to a control input of the first current source 112 through a signal path 122, a control input of the second current source 114 through a signal path 124, a control input of the first switch 116 through a signal path 123, and a control input of the second switch 118 through a signal path 125. In addition, the controller 120 is electrically coupled to a control input of the third switch 402 through a signal path 414, a control input of the fourth switch 404 through a signal path 416, a control input of the fifth switch 406 through a signal path 418, and to a control input of the sixth switch 408 through a signal path 420.

First capacitor 108, second capacitor 110, first current source 112, second current source 114, first switch 116, second switch 118, and controller 120 were previously described and illustrated with reference to FIG. 1B. Third switch 402 is controlled based on a control signal on signal path 414 from controller 120. In response to a first state of the control signal on signal path 414, third switch 402 is closed to connect the power supply input node 106 to the stimulation node 410. In response to a second state of the control signal on signal path 414, third switch 402 is opened to disconnect the power supply input node 106 from the stimulation node 410. The third switch 402 is closed to charge the second capacitor 110 from a DC to DC converter electrically coupled to the power supply input node 106. In one example, the third switch 402 is used in a constant voltage mode.

Fourth switch 404 is controlled based on a control signal on signal path 416 from controller 120. In one example, where fourth switch 404 is a single-pole switch, in response to a first state of the control signal on signal path 416, fourth switch 404 is closed to connect the stimulation node 410 to an output node 412. In response to a second state of the control signal on signal path 416, fourth switch 404 is opened to disconnect the stimulation node 410 from the output node 412. In another example, where fourth switch 404 is a multiplexer, in response to a control signal on signal path 416, multiplexer 404 selectively connects the stimulation node 410 to selected output nodes 412 (i.e., to a single selected output node or to a plurality of selected output nodes).

Fifth switch 406 is controlled based on a control signal on signal path 418 from controller 120. In one example, where fifth switch 406 is a single-pole switch, in response to a first state of the control signal on signal path 418, fifth switch 406 is closed to connect the node 407 to an output node 412. In response to a second state of the control signal on signal path 418, fifth switch 406 is opened to disconnect the node 407 from the output node 412. In another example, where fifth switch 406 is a multiplexer, in response to a control signal on signal path 418, multiplexer 406 selectively connects the node 407 to a selected output node 412. The selected output node 412 in this case may correspond to the positive output node 102 previously described and illustrated with reference to FIGS. 2A-3E.

Sixth switch 408 is controlled based on a control signal on signal path 420 from controller 120. In one example, where sixth switch 408 is a single-pole switch, in response to a first state of the control signal on signal path 420, sixth switch 408 is closed to connect the node 409 to an output node 412. In response to a second state of the control signal on signal path 420, sixth switch 408 is opened to disconnect the node 409 from the output node 412. In another example, where sixth switch 408 is a multiplexer, in response to a control signal on signal path 420, multiplexer 408 selectively connects the node 409 to a selected output node 412. The selected output node 412 in this case may correspond to the negative output node 104 previously described and illustrated with reference to FIGS. 2A-3E.

Controller 120 may operate output signal driver 400 in a voltage stimulation mode or a current stimulation mode. The controller 120 selectively controls the first switch 116, the second switch 118, the first current source 112, the second current source 114, the third switch 402, the fourth switch 404, the fifth switch 406, and the sixth switch 408 to apply one of the constant voltage pulses to selected output nodes of the plurality of output nodes 412 and constant current pulses to selected output nodes of the plurality of output nodes 412. In the voltage stimulation mode, controller 120 disables first current source 112 and second current source 114 and controls first switch 116, second switch 118, third switch 402, fourth switch 404, fifth switch 406, and sixth switch 408 to apply complementary constant voltage pulses between at least two output nodes 412. In the current stimulation mode, controller 120 opens first switch 116 and second switch 118 and controls first current source 112, second current source 114, third switch 402, fourth switch 404, fifth switch 406, and sixth switch 408 to apply complementary constant current pulses between at least two output nodes 412.

The operation of output signal driver 400 in the voltage stimulation mode was described with reference to FIGS. 2A-2C. Referring back to FIG. 2A, when output signal driver 400 is operated in the voltage stimulation mode, stimulation node 410 corresponds to signal path 207, fourth switch 404 corresponds to switch 208, the combination of first switch 116 and fifth switch 406 correspond to switch 204, and the combination of second switch 118 and sixth switch 408 correspond to switch 206. In addition, the selected output node 412 connected via the fifth switch 406 to node 407 corresponds to the positive output node 102, and the selected output node 412 connected via the sixth switch 408 to node 409 corresponds to the negative output node 104.

The operation of output signal driver 400 in the current stimulation mode was described with reference to FIGS. 3A-3E. Referring back to FIG. 3A, when output signal driver 400 is operated in the current stimulation mode, stimulation node 410 corresponds to signal path 207, fourth switch 416 corresponds to switches 208 and 306, fifth switch 406 correspond to switch 302, and sixth switch 408 correspond to switch 304. In addition, the selected output node 412 connected via the fifth switch 406 to node 407 corresponds to the positive output node 102, and the selected output node 412 connected via the sixth switch 408 to node 409 corresponds to the negative output node 104.

Figure 5A:
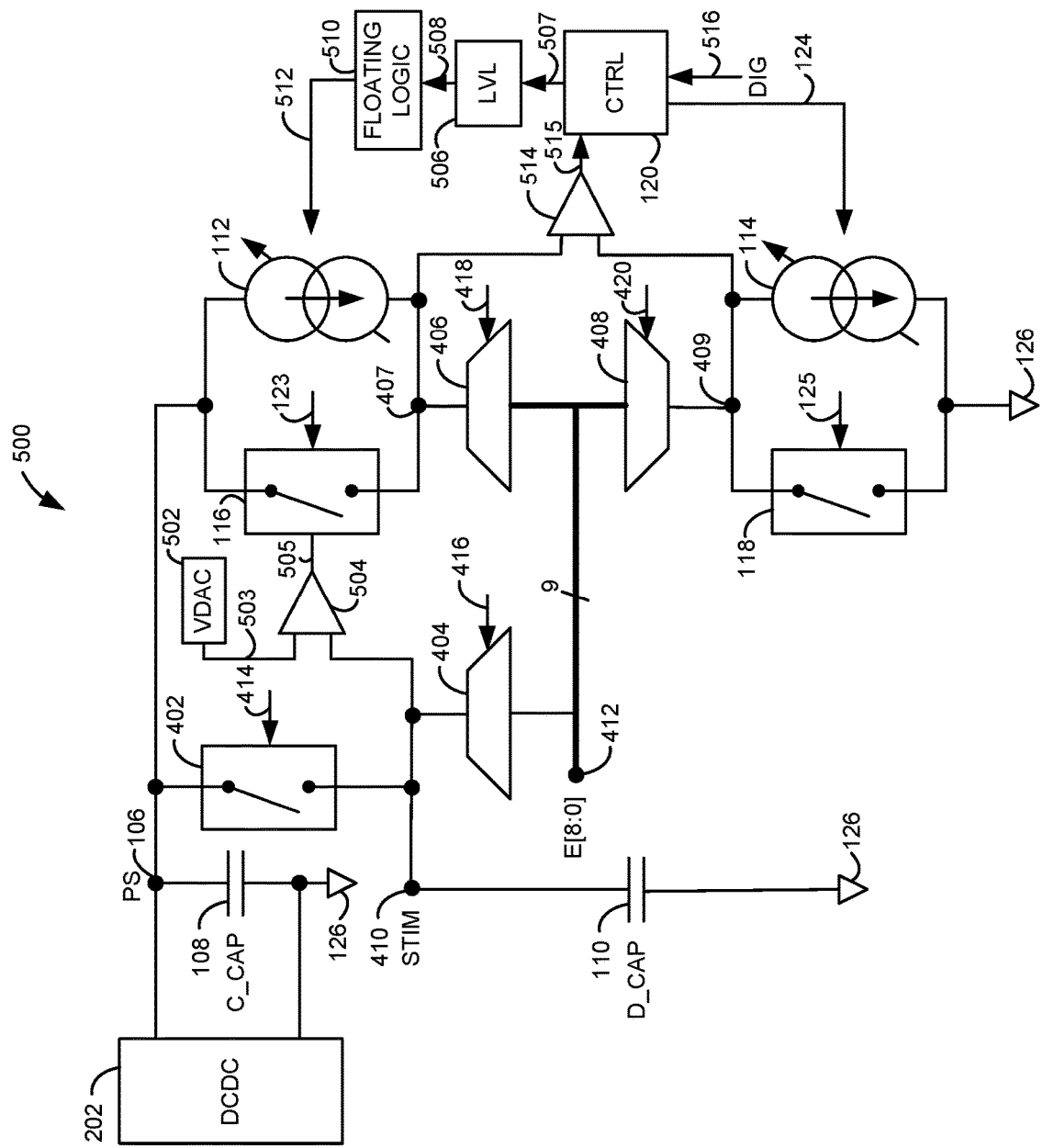
FIGS. 5A and 5B are schematic diagrams illustrating another example of an output signal driver.

FIG. 5A is a schematic diagram illustrating another example of an output signal driver 500. Output signal driver 500 is similar to output signal driver 400 previously described and illustrated with reference to FIG. 4, except that output signal driver 500 also includes a reference voltage generator (e.g., a digital to analog converter (VDAC)) 502, a first comparator 504, a level shifting circuit 506, a floating logic circuit 510, and a second comparator 514. A first input of the first comparator 504 is electrically coupled to the stimulation node 410. A second input of the first comparator 504 is electrically coupled to the reference voltage generator 502 through a signal path 503. The output of the first comparator 504 is electrically coupled to a control input of first switch 116 through a signal path 505. First comparator 504 compares a voltage on the stimulation node 410 to a reference voltage from the reference voltage generator 502 to provide a safety signal to the first switch 116. The safety signal from comparator 504 indicates whether the voltage $V_{STIM}$ on the stimulation node 410 has been disrupted to ensure that a known voltage is present on the second capacitor 110. In response to a change in voltage, the safety signal may disable (e.g., open) first switch 116.

A first input of the second comparator 514 is electrically coupled to node 407. A second input of the second comparator 514 is electrically coupled to node 409. The output of second comparator 514 is electrically coupled to an input of controller 120 through a signal path 515. Second comparator 514 compares a voltage at the first switch 116 on node 407 to a voltage at the second switch 118 on node 409 to provide an input signal to the controller 120. The input signal may be used to calibrate the first current source 112 and/or the second current source 114 such that the first current source 112 and the second current source 114 provide equal and opposite currents.

An output of controller 120 is electrically coupled to an input of level shifting circuit 506 through a signal path 507. An output of level shifting circuit 506 is electrically coupled to an input of floating logic circuit 510 through a signal path 508. An output of floating logic circuit 510 is electrically coupled to the control input of first current source 112 through a signal path 512. Level shifting circuit 506 and floating logic circuit 510 are used to control the first current source 112 such that the first current source 112 and the second current source 114 provide equal and opposite currents.

An input of controller 120 receives a digital signal (DIG) on a signal path 516. The digital signal controls the operation of output signal driver 500 including selecting the voltage stimulation mode or the current stimulation mode and setting the timing and voltage/current levels of pulses within each mode.

Output signal driver 500, when used to stimulate tissue, may be disturbed or damaged by external actions (e.g., electric field inducing voltages or magnetic field inducing currents or currents applied across tissue, e.g., defibrillation) or have a latent failure and/or defect in any component. Some failures may lead to imbalanced stimulation where charge injected and returned from tissue is inequal, which may lead to temporary neuropraxia or tissue damage. A failure (including damage or latent component failure) may include an electrical open, an electrical short, a leaky circuit, or a digital logic error. A disturbance may include an unintended voltage or current due to an external action. Accordingly, described below with reference to FIG. 5B is additional circuitry to detect imbalanced stimulation due to the application of either complementary constant current pulses or complementary constant voltage pulses.

Figure 5B:
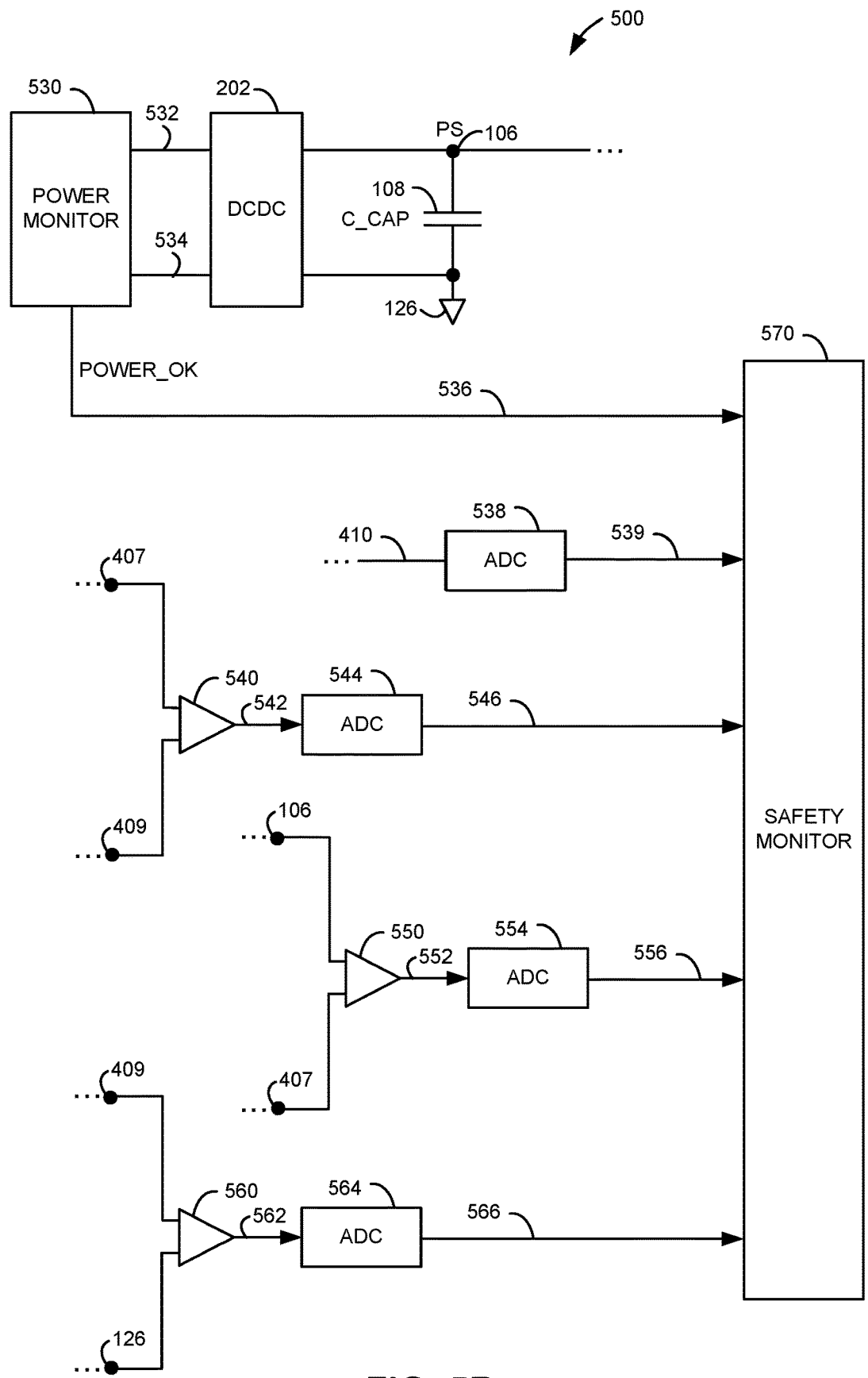

FIG. 5B is a schematic diagram illustrating additional circuitry that may be included as part of the output signal driver 500 of FIG. 5A. FIG. 5B includes a power monitor 530, an analog to digital converter (ADC) 538, a difference amplifier 540, an ADC 544, a difference amplifier 550, an ADC 554, a difference amplifier 560, an ADC 564, and a safety monitor 570. The power monitor 530 is electrically coupled to the DC to DC converter 202 via signal paths 532 and 534. In one example, power monitor 530 may be electrically coupled to the input of DC to DC converter 202 via signal paths 532 and 534. In other examples, power monitor 530 may be electrically coupled to the output of DC to DC converter 202, such that signal path 532 is electrically coupled to power supply input node 106 and signal path 534 is electrically coupled to power supply common node 126. An output (i.e., POWER_OK) signal of the power monitor 530 may be electrically coupled to the safety monitor 570 through a signal path 536.

The stimulation node 410 of FIG. 5A may be electrically coupled to an input of ADC 538. The output of ADC 538 may be electrically coupled to an input of safety monitor 570 through a signal path 539. Node 407 of FIG. 5A may be electrically coupled to a first input of difference amplifier 540. Node 409 of FIG. 5A may be electrically coupled to a second input of difference amplifier 540. The output of difference amplifier 540 may be electrically coupled to an input of ADC 544 through a signal path 542. The output of ADC 544 may be electrically coupled to an input of safety monitor 570 through a signal path 546.

Power supply input node 106 of FIG. 5A may be electrically coupled to a first input of difference amplifier 550. Node 407 of FIG. 5A may be electrically coupled to a second input of difference amplifier 550. The output of difference amplifier 550 may be electrically coupled to an input of ADC 554 through a signal path 552. The output of ADC 554 may be electrically coupled to an input of safety monitor 570 through a signal path 556. Node 409 of FIG. 5A may be electrically coupled to a first input of difference amplifier 560. Power supply common node 126 of FIG. 5A may be electrically coupled to a second input of difference amplifier 560. The output of difference amplifier 560 may be electrically coupled to an input of ADC 564 through a signal path 562. The output of ADC 564 may be electrically coupled to an input of safety monitor 570 through a signal path 566. Outputs (not shown) of safety monitor 570 may be electrically coupled to control inputs of components of FIG. 5A, such as control inputs of switches 116, 118, 402, 404, 406, and 408 and current sources 112 and 114.

In some examples, power monitor 530 and safety monitor 570 may be used to monitor the DC to DC converter 202 performance and/or input power. If power is delivered to the output signal driver 500 that exceeds that intended to be delivered to the tissue 210 or measured to be delivered to the tissue 210, then imbalanced stimulation may exist. In some example, power monitor 530 may be implemented by models and clocks for certain elements where direct measurements are not feasible or have significant side effects.

In some examples, ADC 538 and safety monitor 570 may be used to determine the difference in voltage on the capacitor 110. In other examples, comparator 504 and VDAC 502 may be used in place of ADC 538 to determine the difference in voltage on the capacitor 110. The difference in voltage is the difference in a voltage measured prior to applying a set of complementary pulses and the voltage measured after applying the set of complementary pulses. The voltage prior to applying the set of complementary pulses is set by the output signal driver 500 during normal operation and is therefore a known voltage. Any difference in voltage indicates that charge is left on the tissue 210 (FIGS. 2A-3E), which indicates imbalanced stimulation.

In some examples, ADC 538 and safety monitor 570 may also be used to monitor the voltage of capacitor 110 during a second complementary pulse and terminate the pulse when the difference is zero. In other examples, comparator 504 and VDAC 502 may be used in place of ADC 538 to monitor the voltage of capacitor 110 during a second complementary pulse and terminate the pulse when the difference is zero. The pulse time of the second complementary pulse may be monitored. A longer or shorter pulse time than a threshold pulse time may indicate that charge is left on tissue 210, which indicates imbalanced stimulation.

In some examples, difference amplifier 540, ADC 544, and safety monitor 570 may monitor residual voltage remaining on tissue 210 after one or more complementary pulses. This voltage should be near zero if the output signal driver 500 is providing balanced stimulation. This voltage may not be exactly zero due to nonlinear behavior of tissue 210 and due to externally induced voltages.

In some examples, difference amplifier 550, ADC 554, and safety monitor 570 may monitor compliance of current source 112, and difference amplifier 560, ADC 564, and safety monitor 570 may monitor compliance of current sink 114 during each corresponding pulse. As used herein, "compliance" means that the current source/sink circuit has adequate voltage to source/sink desired current. If either the source or sink is out of compliance, charge imbalance may result. Out of compliance may also occur if tissue 210 has a large impedance, for example as a stimulation lead is repositioned during a surgical procedure, as high voltage is required to source/sink current into high impedance. This type of out of compliance may not indicate a safety concern as the actual current delivered to tissue 210 is low or zero, so detection means may not activate if both source and sink are temporarily out of compliance.

If imbalanced stimulation is detected by any of the above circuitry, one or more of the following actions may be performed by the safety monitor 570. The delivery of further stimulation may be stopped. The patient or another user may be notified. Diagnostic data regarding the imbalanced stimulation may be stored, and/or the diagnostic data may be transferred to a cloud server.

It may be undesirable to perform the above actions based on a single detection of imbalanced stimulation, for example, if the detection is transient (e.g., due to an external disturbance) or the detection is in error due to noise. To address this issue, safety monitor 570 may include one or more filters between detection of imbalanced stimulation and performing an action based on the detection. In one example, the filters may include counting N detections before performing an action or counting N detections within a time T before performing an action. In other examples, the filters may include incrementing a counter on detection and decrementing the counter at a fixed rate, and in response to the counter reaching a threshold, performing an action.

The detection of imbalanced stimulation and the stopping of further stimulation in response to the detection may be implemented in hardware circuitry rather than in software as software may be considered unreliable for the purposes of safety risk analysis (e.g., software is assumed to have a failure probability of 1). Software may configure and/or enable the hardware circuitry, but stopping of stimulation should be performed solely by the hardware circuitry.

The effectiveness of stimulation may be variable over time as healing, trauma, or other effects occur at the electrode-tissue interface, causing a change in impedance and therefore a change in the current for stimulation delivered using the voltage stimulation mode. Accordingly, the circuitry described below may be used to measure the impedance and adjust the delivered stimulation based on the measured impedance.

Difference amplifier 540, ADC 544, and safety monitor 570 may also be used to measure impedance between nodes 407 and 409 by sensing the voltage between nodes 407 and 409 during a stimulation pulse and calculating the impedance by dividing the sensed voltage by the known current applied to nodes 407 and 409. In some examples, the measured impedance may be used to change the stimulation pulse amplitude delivered using the voltage stimulation mode to effect constant stimulation based on the measured impedance. Impedance measurement pulses may be periodically scheduled to occur while delivering intermittent or continuous stimulation using the voltage stimulation mode. For example, an impedance measurement pulse may be substituted for a voltage pulse or be provided in addition to a voltage pulse. An impedance measurement pulse may be subthreshold (e.g., not perceptible by the patient) or suprathreshold (e.g., perceptible by the patient). In other examples, the power supply voltage of the circuit used to deliver stimulation using the current mode may be changed to minimize the power supply voltage based on the measured impedance while still ensuring compliance of the current sources.

Figure 6:
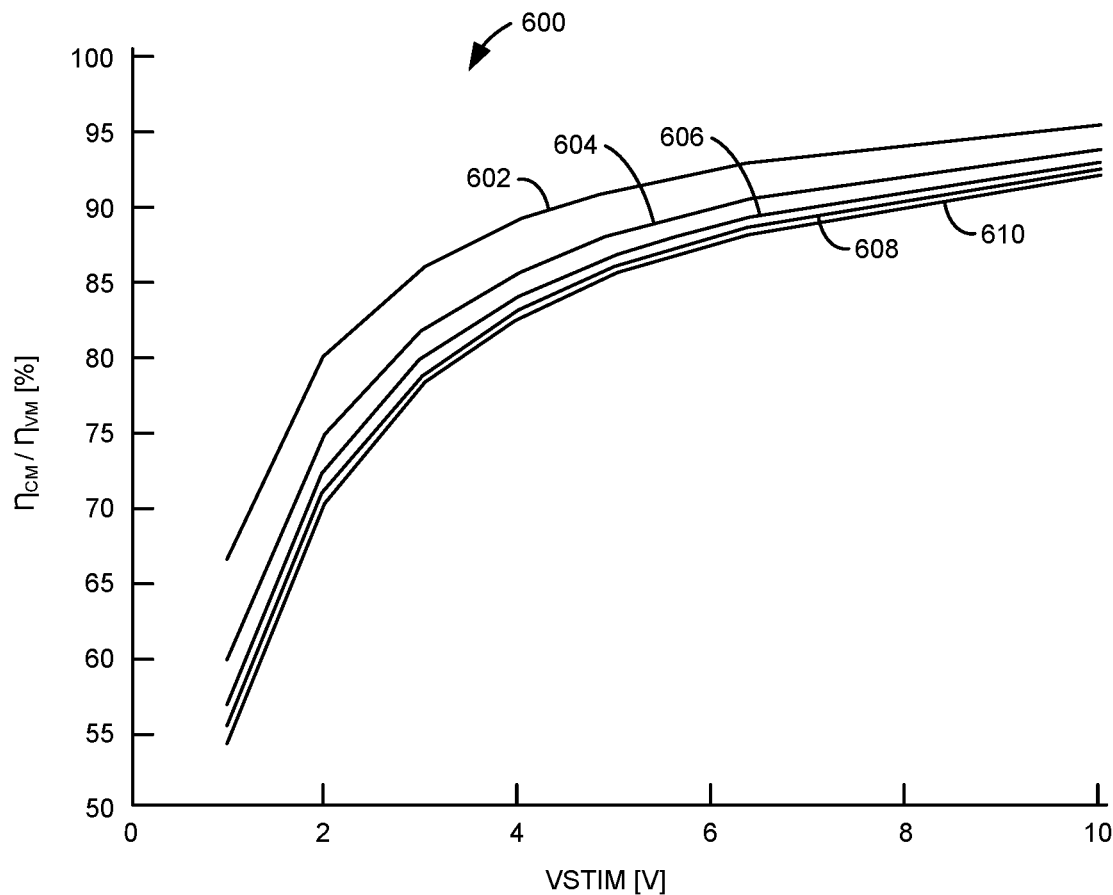
FIG. 6 is a chart illustrating one example of the efficiency of an output signal driver.

FIG. 6 is a chart 600 illustrating one example of the efficiency of an output signal driver, such as output signal driver 100, 101, 400, or 500 previously described and illustrated with reference to FIGS. 1A, 1B, 4, and 5, respectively. Chart 600 illustrates current stimulation mode efficiency versus voltage stimulation mode efficiency for different stimulation voltages $V_{STIM}$. $V_{STIM}$ in volts is illustrated on the x-axis, while current mode efficiency ($\eta_{cm}$) versus voltage mode efficiency ($\eta_{vm}$) in percent is illustrated on the y-axis. Line 602 represents the efficiency for $t_{RCHG}=1*t_{STIM}$, line 604 represents the efficiency for $t_{RCHG}=2*t_{STIM}$, line 606 represents the efficiency for $t_{RCHG}=3*t_{STIM}$, line 608 represents the efficiency for $t_{RCHG}=4*t_{STIM}$, and line 604 represents the efficiency for $t_{RCHG}=5*t_{STIM}$.

In the active charge phase and complementary phase, the DC to DC converter only provides energy to the system during the active complementary phase. The total energy ($E_{DCDC}$) form the DC to DC converter may be calculated as:

$$E_{DCDC} = V_{DCDC} \cdot Q_{STIM} = Q_{STIM} \cdot \left[ Q_{STIM} \left[ R_{tissue} \cdot \frac{t_{RCHG} + t_{STIM}}{t_{RCHG} t_{STIM}} + \frac{C_{eq} + C_{D\_CAP}}{C_{eq} C_{D\_CAP}} \right] + 2V_{HR} \right]$$

where: $Q_{STIM}$ is the charge delivered to tissue 210 during the active charge phase;

$R_{tissue}$ is the resistance of tissue 210 (e.g., 5 kOhm);

$t_{RCHG}$ (e.g., 62.5 μS) is the time the active complementary phase is enabled;

$t_{STIM}$ is the time (e.g., 62.5 μS) the active charge phase is enabled;

$C_{D\_CAP}$ is the capacitance of the second capacitor 110; and $V_{HR}$ is the voltage headroom (e.g., 1V) for keeping the first current source 112 and the second current source 114 in a saturation region.

This results in an efficiency comparison with the voltage mode stimulation as:

$$\frac{\eta_{cm}}{\eta_{vm}} = \frac{a \cdot V_{STIM}}{V_{STIM} \cdot (1 - \epsilon_{settling}) \cdot \left( R_{tissue} \cdot \frac{t_{STIM} + t_{RCHG}}{t_{STIM} \cdot t_{RCHG}} \cdot \frac{C_{eq} C_{D\_CAP}}{C_{eq} + C_{D\_CAP}} + 1 \right) + 2V_{HR}}$$

where: α is the alpha factor; and
$\epsilon_{settling}$ is the settling error.
The alpha factor α is given by:

$$a \geq \frac{1 - \exp\left(-\frac{t_{RCHG} + t_{STIM}}{R_{tissue} C_{eg}}\right)}{1 - \exp\left(-\frac{t_{RCHG}}{R_{tissue} C_{eq}}\right)}$$

As indicated by chart 600, an efficiency of the output signal driver with the controller applying constant current pulses is within 80 percent of the efficiency of the output signal driver with the controller applying constant voltage pulses for stimulation voltages greater than 4V.

Figure 7:
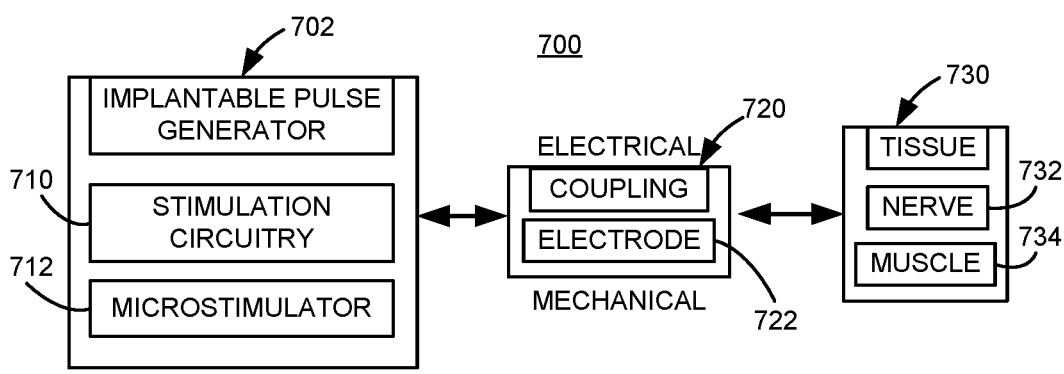
FIG. 7 is a block diagram schematically illustrating one example of an implantable medical device comprising example stimulation circuitry.

FIG. 7 is a block diagram 700 schematically illustrating an example implantable medical device in coupling relation to tissue. In some examples, the implantable medical device comprises an implantable pulse generator (IPG) 702 including stimulation circuitry 710 for generating and applying a stimulation signal to tissue 730. In some examples, the tissue 730 may comprise a nerve 732, such as one of the types of nerves previously described for treating sleep disordered breathing, pelvic/bladder dysfunctions, cardiac issues, CNS issues, or other physiologic maladies amenable to neurostimulation therapy. In some examples, the tissue 730 may comprise a muscle(s) 734, the stimulation of which may provide therapeutic benefits in addition to, or instead of, nerve stimulation.

In some examples, the stimulation circuitry 710 may comprise at least some of substantially the same features and attributes as the examples of an output signal driver as described and illustrated in association with FIGS. 1-6. In some examples, the IPG 702 may be implanted within a patient's body with the stimulation circuitry 710 (e.g., at least an output signal driver) in stimulating relation to tissue 730 via coupling 720. In some examples, coupling 720 comprises at least a stimulation electrode(s) 722. In some examples, the coupling 720 may comprise a stimulation lead having a proximal end connectable to the IPG 702 and an opposite distal end supporting the stimulation electrode(s) 722 to engage the tissue 730 or be in close proximity to the tissue 730. The IPG 702 may be implanted subcutaneously, or even percutaneously in some examples. The stimulation electrode(s) 722 may take the form of a cuff electrode, paddle electrode, or axial electrode, and the like. Via such arrangements and as further represented in FIG. 7, the coupling 720 (including electrode 722) comprises at least an electrical connection between the IPG 702 and the tissue 730 and in some instances, also may provide a mechanical connection therebetween.

In some examples, the IPG 702 may be implemented as a microstimulator 712, which is sized and shaped for implantation in smaller anatomical spaces than a regular-sized IPG 702. Accordingly, the microstimulator 712 may be implanted transvenously, percutaneously, or subcutaneously. In some such examples, the microstimulator 712 may comprise a housing on which the stimulation electrode(s) 722 is provided, such that no stimulation lead is used. However, in some examples, the microstimulator 712 may be connected to a stimulation lead instead of, or in addition to, such stimulation electrode(s) 722 on the surface of the housing of the microstimulator 712.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An output signal driver comprising:
   a positive output node;
   a negative output node;
   a power supply input node;
   a power supply common node;
   a charging capacitor coupled to the power supply input node;
   a discharging capacitor coupled to the negative output node;
   a current source coupled between the power supply input node and the positive output node;
   a current sink coupled between the positive output node and the power supply common node;
   a first switch coupled in parallel with the current source;
   a second switch coupled in parallel with the current sink; and
   a controller coupled to the current source, the current sink, the first switch, and the second switch to apply either complementary constant current pulses or complementary constant voltage pulses to the positive output node,
   wherein the output signal driver is part of an implantable medical device, and
   wherein the implantable medical device is configured to treat sleep disordered breathing.

2. The output signal driver of claim 1, wherein the current source is a variable current source, and
   wherein the current sink is a variable current sink.

3. An output signal driver comprising:
a positive output node;
a negative output node;
a power supply input node;
a power supply common node;
a charging capacitor coupled to the power supply input node;
a discharging capacitor coupled to the negative output node;
a current source coupled between the power supply input node and the positive output node;
a current sink coupled between the positive output node and the power supply common node;
a first switch coupled in parallel with the current source;
a second switch coupled in parallel with the current sink; and
a controller coupled to the current source, the current sink, the first switch, and the second switch to apply either complementary constant current pulses or complementary constant voltage pulses to the positive output node;
wherein an efficiency of the output signal driver with the controller applying constant current pulses is within 80 percent of the efficiency of the output signal driver with the controller applying constant voltage pulses for stimulation voltages greater than 4V.

4. The output signal driver of claim 3, wherein the output signal driver is part of an implantable medical device, and wherein the implantable medical device is configured to treat sleep disordered breathing.

5. An output signal driver comprising:
a positive output node;
a negative output node;
a power supply input node;
a power supply common node;
a charging capacitor coupled to the power supply input node;
a discharging capacitor coupled to the negative output node;
a current source coupled between the power supply input node and the positive output node;
a current sink coupled between the positive output node and the power supply common node;
a first switch coupled in parallel with the current source;
a second switch coupled in parallel with the current sink;
a controller coupled to the current source, the current sink, the first switch, and the second switch to apply either complementary constant current pulses or complementary constant voltage pulses to the positive output node;
a DC to DC converter electrically coupled to the power supply input node.

6. The output signal driver of claim 5, wherein the output signal driver is part of an implantable medical device, and wherein the implantable medical device is configured to treat sleep disordered breathing.

7. An output signal driver comprising:
a power supply input node;
a power supply common node;
a stimulation node;
a first current source coupled to the power supply input node;
a first switch coupled in parallel with the first current source;
a second current source coupled to the power supply common node;
a second switch coupled in parallel with the second current source;
at least one output node;
a controller to selectively control the first switch, the second switch, the first current source, and the second current source to apply either constant voltage pulses to at least one output node or constant current pulses to at least one output node; and
a third switch coupled between the power supply input node and the simulation node.

8. The output signal driver of claim 7, further comprising:
a plurality of output nodes including the at least one output node;
a fourth switch coupled between the stimulation node and the plurality of output nodes;
a fifth switch coupled between the first switch, the first current source, and the plurality of output nodes; and
a sixth switch coupled between the second switch, the second current source, and the plurality of output nodes,
wherein the controller is to selectively control the fourth switch, the fifth switch, and the sixth switch to apply one of the constant voltage pulses to selected output nodes of the plurality of output nodes and the constant current pulses to selected output nodes of the plurality of output nodes.

9. The output signal driver of claim 8, further comprising:
a plurality of electrodes, each electrode of the plurality of electrodes coupled to a corresponding output node of the plurality of output nodes.

10. The output signal driver of claim 7, further comprising:
a DC to DC converter coupled to the power supply input node.

11. The output signal driver of claim 7, further comprising:
a first capacitor coupled between the power supply input node and the power supply common node; and
a second capacitor coupled between the stimulation node and the power supply common node.

12. The output signal driver of claim 7, further comprising:
a first comparator to compare a voltage on the stimulation node to a reference voltage to provide a control signal to the first switch.

13. The output signal driver of claim 7, further comprising:
a second comparator to compare a voltage at the first switch to a voltage at the second switch to provide an input signal to the controller.

14. The output signal driver of claim 7, further comprising:
a level shifting circuit coupled to an output of the controller; and
a floating logic circuit coupled between an output of the level shifting circuit and a control input of the first current source.

15. The output signal driver of claim 7, wherein the first current source comprises a variable first current source; and wherein the second current source comprises a variable second current source.

16. The output signal driver of claim 7, wherein the output signal driver is part of an implantable medical device, and wherein the implantable medical device is configured to treat sleep disordered breathing.

17. An implantable medical device comprising:
a power supply input node to receive a DC voltage;
a power supply common node;
a stimulation node;

a variable first current source coupled to the power supply input node;
a first switch coupled in parallel with the first current source;
a variable second current source coupled to the power supply common node;
a second switch coupled in parallel with the second current source;
a plurality of output nodes;
a first multiplexer coupled between the stimulation node and the plurality of output nodes;
a second multiplexer coupled between the first switch, the first current source, and the plurality of output nodes;
a third multiplexer coupled between the second switch, the second current source, and the plurality of output nodes; and
a controller to selectively control the first switch, the second switch, the first current source, the second current source, the first multiplexer, the second multiplexer, and the third multiplexer to apply either constant voltage pulses to selected output nodes of the plurality of output nodes or constant current pulses to selected output nodes of the plurality of output nodes.

18. The implantable medical device of claim 17, wherein the controller opens the first switch and the second switch to apply constant current pulses to the selected output nodes or closes the first switch and the second switch to apply constant voltage pulses to the selected output nodes.

19. The implantable medical device of claim 17, further comprising:
a first capacitor coupled between the power supply input node and the power supply common node; and
a second capacitor coupled between the stimulation node and the power supply common node.

20. The implantable medical device of claim 19, further comprising:
a third switch coupled between the power supply input node and the stimulation node.

21. The implantable medical device of claim 20, wherein the controller closes the third switch to charge the second capacitor.

22. The output signal driver of claim 17, wherein the implantable medical device is configured to treat sleep disordered breathing.

* * * * *